May 7, 1968 LA MARCUS C. HAWES ETAL 3,381,758
UNBANKER FOR SMALL TREES
Filed July 7, 1965 2 Sheets-Sheet 2

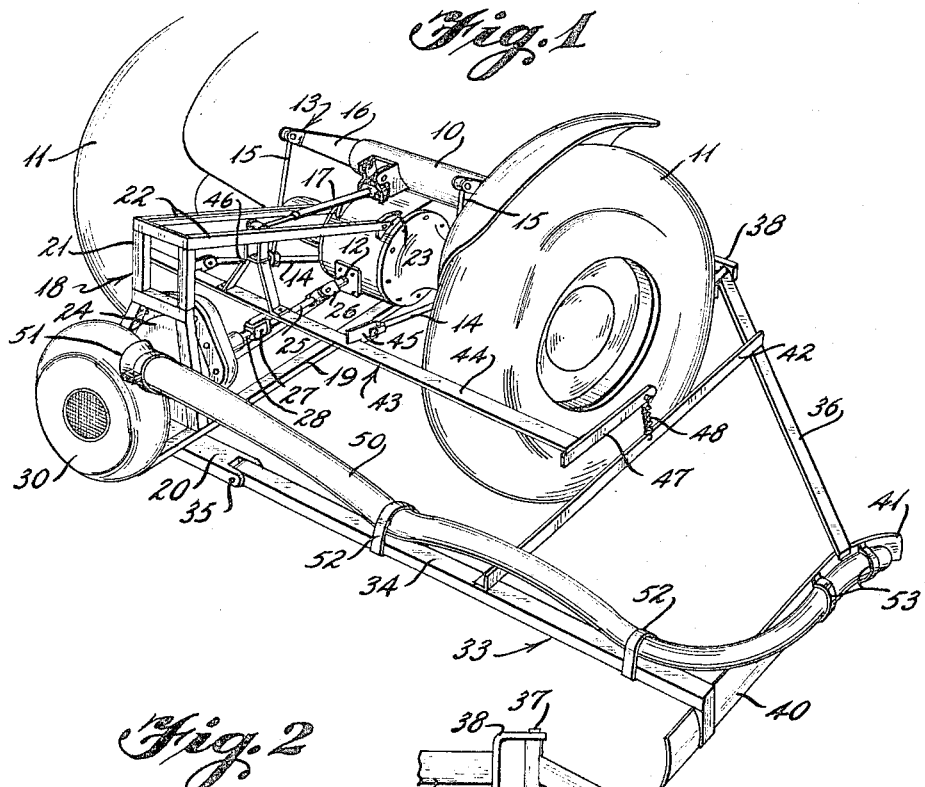
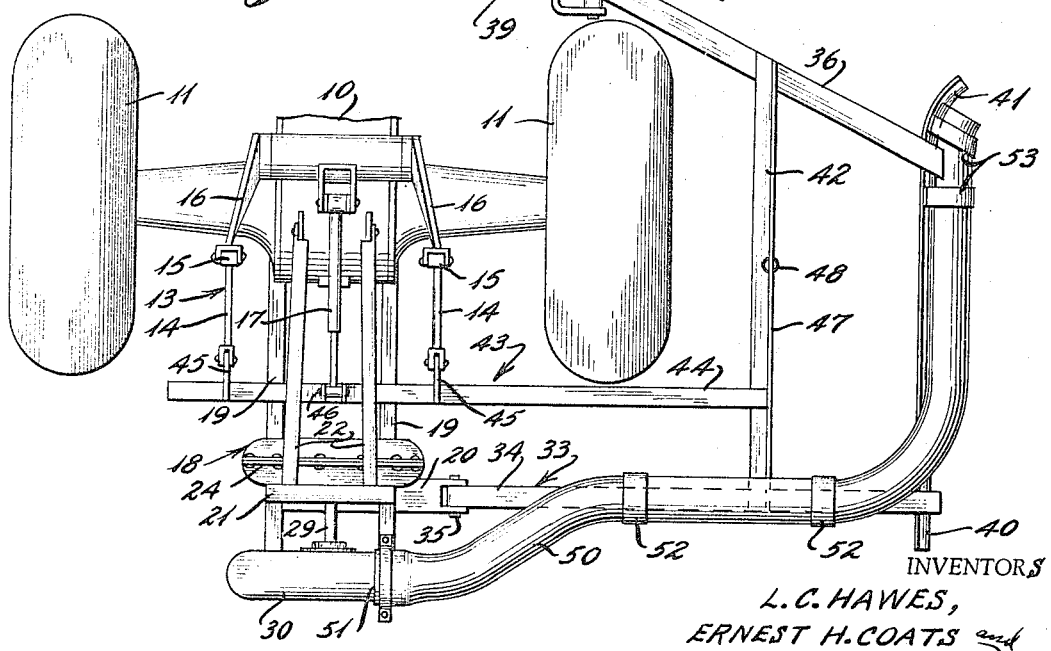

INVENTORS
L. C. HAWES,
ERNEST H. COATS &
FRED W. COOPER
BY *Hyatt & Dowell*
*Hyatt & Dowell*
ATTORNEYS

United States Patent Office 3,381,758
Patented May 7, 1968

3,381,758
UNBANKER FOR SMALL TREES
La Marcus C. Hawes, Box 402, Dade City, Fla. 33525;
Ernest H. Coats, Rte. 1, Box 232, Zephyrhills, Fla.
33599; and Fred W. Cooper, 706 E. Buford Ave., Dade
City, Fla. 33525
Filed July 7, 1965, Ser. No. 469,982
5 Claims. (Cl. 172—33)

ABSTRACT OF THE DISCLOSURE

Apparatus for mounting on a supporting vehicle for moving matter such as earth on a supporting surface comprising an earth engaging blade with means for mounting the same for elevational adjustment on a supporting vehicle, a fluid nozzle and means for mounting the same in operative relation to said blade, a supply hose connected to said fluid nozzle whereby when said blade is mounted on a supporting vehicle and is operated to move matter upon such supporting surface and fluid pressure is admitted through said supply hose and fluid nozzle matter will be moved in addition to that moved by said blade.

---

This invention relates to the cultivation of the soil and to apparatus and equipment for altering the position and appearance of the earth in the vicinity of young trees or plants.

The invention relates particularly to apparatus and equipment which may be mounted on a tractor and utilized for removing earth from around young trees where it has been banked to protect such trees.

It has been the practice, particularly through the citrus belt, to bank earth around the trunks of young tender trees and seedlings, especially during the winter months, to provide protection from freezing as well as to provide protection from rodents such as rabbits, mice and the like. The banking of the earth around the trunks has not presented a problem since the earth has been scooped up at a distance from the trunk and deposited around the same. After the danger of frost has passed, it is necessary that the bank of earth be removed.

The removal of the bank of earth from the tree trunk has been a relatively delicate operation due to the tenderness of the tree and its bark, particularly after it has been underground for an extended period of time. Some devices for removing the bank of earth have been provided; however, these prior devices have been cumbersome and unwieldy, expensive, difficult to maintain because of the abrasive action of the earth, and have not been able to remove the earth from the trunk without bruising the same thereby causing injury.

It is an object of the invention to provide a relatively simple, inexpensive unbanking device which can be mounted on a propelling vehicle and which will remove substantially all of the earth from around a tree trunk without coming into contact with the tree.

Another object of the invention is to provide apparatus having blade means for positively removing most of the earth from around a tree trunk and means producing air under pressure for removing the remaining earth from the tree.

A further object of the invention is to provide a forced air system for removing earth from a tree trunk which is driven from the power take-off of a propelling vehicle.

Figure 3:
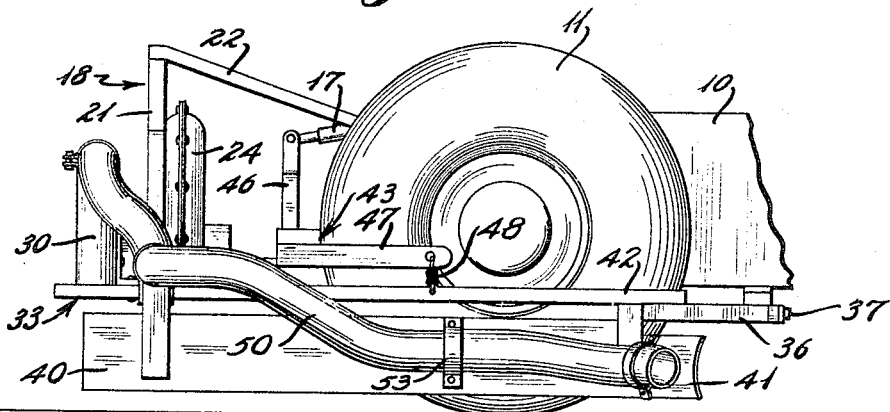
Figure 4:
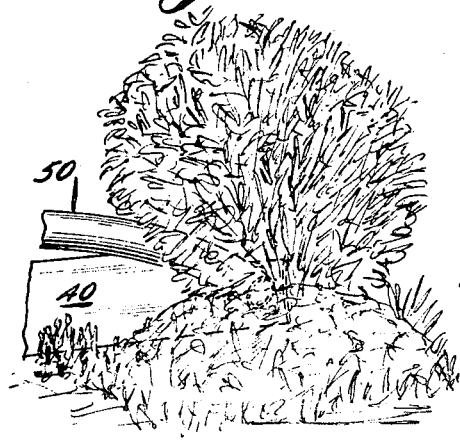
Figure 5:
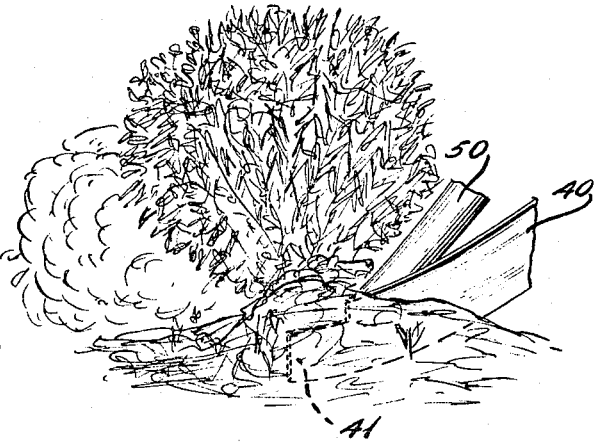

Other objects and advantages of the invention will be apparent from the following description considered in conjunction with the accompanying drawings wherein:

FIG. 1 is a perspective illustrating one application of the invention;

FIG. 2, a top plan view thereof;

FIG. 3, a side elevation;

FIG. 4, a perspective illustrating the use of the device at the beginning of the operation;

FIG. 5, a perspective illustrating the earth partially removed; and

Figure 6:
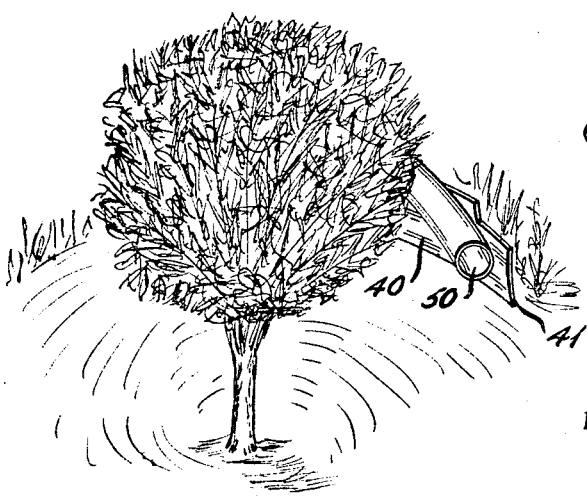

FIG. 6, a perspective illustrating the earth completely removed and the tree trunk exposed.

Briefly stated, the present invention is a relatively simple unbanker for removing earth from around the trunk of a small tree and includes a frame mounted on a propelling vehicle. The frame has a fixed blade on its outer end for removing most of the earth and a blower driven from the power take-off of the vehicle which forces air under pressure through a hose having its discharge end mounted exteriorly of the blade for removing the remaining earth from the tree trunk.

With continued reference to the drawings, a tractor 10 is provided having drive wheels 11, a power take-off 12, and a three point lift mechanism 13 which can be selectively operated by the operator of the tractor in a conventional manner. The lift mechanism includes a pair of draft arms 14 connected by links 15 to lift arms 16. Also the lift mechanism includes an adjustable link 17 pivotally mounted on the tractor at a higher elevation than the draft arms 14.

The present invention includes a fixed frame 18 including a pair of generally parallel lower arms 19 mounted at their forward ends on the undercarriage of the tractor and connected adjacent their outer ends by a bar 20. An upstanding generally inverted U-shaped end member 21 is connected to the lower arms 19 adjacent their outer ends. A pair of spaced upper arms 22 are fixed at one end to the end member 21 and are connected at their opposite ends to lugs 23 on the differential housing of the tractor. The frame 18 provides a relatively rigid support for a gear box 24 mounted on the end member 21 and the lower arms 19 in any desired manner. A drive shaft 25 is connected at one end by a universal 26 to the power take-off 12 and is connected at the other end by a universal 27 to the input shaft 28 of the gear box 24. The output shaft 29 of the gear box drives a fan or blower 30 carried by the lower arms 19.

A generally horizontally disposed implement support frame or outrigger 33 is provided having a rear member 34 disposed substantially normal to the path of travel of the tractor and connected to the bar 20 by a pivot pin 35. A front member 36 is pivotally mounted at one end by a pivot pin 37 to a bracket 38 carried by a support 39 on the tractor 10 forwardly of one of the drive wheels 11. An elongated blade 40 is mounted on the outer ends of the members 34 and 36. If desired the forward end of the blade 40 may have an outwardly curved portion 41 to facilitate removal of earth close to the trunk of the tree. A cross brace 42 connects the front member 36 to the rear member 34 for a purpose to be described later.

In order to raise and lower the implement support frame 33, a movable or floating frame 43 is provided including a lift bar 44 having spaced ears 45 engageable with the draft arms 14 for raising and lowering the frame 43. An A-frame 46 is mounted on the lift bar 44 for connection to the adjustable link 17 to provide a three point connection. The lift bar 44 extends outwardly to a position above the cross brace 42 and a forwardly extending bar 47 is fixed to the outer end thereof. A chain, cable or other connecting link 48 connects the bar 47 with the cross brace 42 so that when the lift arms 16 are raised, the implement support frame 33 will be pivoted upwardly about the pivots 35 and 37 and, conversely, when the lift arms are lowered, the blade 40 can be lowered into engagement with the earth.

The blade 40 will remove most of the earth from around the trunk of a young tree; however, since the blade should not touch the tree, some earth would remain on the trunk and lowermost links. In order to remove this remaining earth, a flexible hose 50 is connected to the discharge 51 of the blower 30 and extends outwardly along the rear member 34 to which it is connected by clamps 52. The free end of the hose curves forwardly and downwardly and is connected to the outer side of the blade 40 by clamps 53. The discharge end of the hose preferably is located directly behind the curved portion 41 so that air under pressure will be directed on the tree trunk to remove the dirt left by the blade. If desired, a nozzle (not shown) can be mounted on the discharge end of the hose 50 to provide a variety of air exhaust patterns.

In the operation of the device, the lift mechanism 13 normally maintains the implement support frame 33 in raised position and the blade 40 out of contact with the ground until the tractor has reached an unbanking position. The blade is then lowered until the leading edge of the curved portion 41 is in proximity to the tree trunk after which the tractor is driven in a circle about the tree. The blade 40 will remove most of the earth while the tractor is circling the tree. Simultaneously, the blower 30 is driven from the power take-off of the tractor to force air under pressure through the hose 50 and remove the remaining earth from the tree. After the earth has been removed, the implement support frame is again raised and the tractor moved to the next tree.

It will be apparent that a relatively simple apparatus has been provided which will remove substantially all of the earth from around a tree trunk without harming the tree.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus mounted on a propelling vehicle having a power take-off and a lift mechanism and adapted to remove a bank of earth from around young trees comprising a fixed frame mounted on the propelling vehicle, an implement support frame pivotally mounted on said fixed frame, an earth engaging implement mounted on said support frame, blower means carried by said fixed frame and driven from the power take-off of the vehicle, a flexible hose connected to said blower means and extending outwardly to said implement, a floating frame carried by the lift mechanism of the vehicle, and link means connecting said floating frame and said implement support frame, whereby said implement will remove most of the bank of earth from the tree and air pressure from said blower means will remove the remaining earth from the tree.

2. The structure of claim 1, in which the forward end of said implement is curved outwardly.

3. Apparatus mounted on a vehicle having a power take-off and a lift mechanism for removing a bank of earth from around the trunk of a young tree comprising a fixed frame mounted on the vehicle, gearing carried by said fixed frame, means drivingly connecting said gearing to the power take-off of the vehicle, blower means mounted on said fixed frame and driven by said gearing, an implement support frame pivotally mounted on said fixed frame, an earth engaging blade carried by said implement support frame, one end of said blade being curved outwardly away from the vehicle, flexible hose means connected to said blower means and extending outwardly to said blade, the discharge end of said hose means terminating adjacent to the curved end of said blade, a floating frame carried by the lift mechanism of the tractor, and link means connecting said floating frame and said implement support frame for controlling the position of said blade and the discharge end of said hose means.

4. Apparatus carried by a propelling vehicle and used for moving material away from an object comprising a first frame removably mounted on the vehicle, a second frame swingably mounted on said first frame and extending laterally to one side of the vehicle, an elongated blade having a forward portion and a rearward portion mounted on said second frame, at least the forward portion of said blade being inclined away from the vehicle, flexible hose means carried by said second frame and having a discharge located adjacent to the forward portion of said blade, said discharge being located on the remote side of said blade from said vehicle, means for forcing fluid under pressure through said flexible hose means and discharging said fluid forwardly of said blade, and means for raising and lowering said second frame relative to said first frame, whereby as the vehicle circles the object said blade will move most of the material away from the object and fluid under pressure from said flexible hose means will move the remaining material away from the object.

5. Apparatus carried by a propelling vehicle having a lift mechanism for removing earth from around the trunk of a tree comprising a first frame mounted on the vehicle, a second frame swingably mounted for generally vertical movement on said first frame and extending laterally to one side of the vehicle, an elongated earth engaging blade having a forward portion and a rearward portion carried by said second frame, the forward portion of said blade being curved outwardly away from said first frame, flexible hose means having a discharge located adjacent to the forward portion of said blade, said discharge being located on the remote side of said blade from said vehicle, means for forcing air under pressure through said flexible hose means, and means connecting the lift mechanism of the vehicle with said second frame for swinging said second frame and said blade relative to said first frame, whereby when said vehicle circles a tree said blade will move most of the earth away from the truck and air from said flexible hose means will move the remaining earth away from the trunk.

References Cited
UNITED STATES PATENTS 2,222,437  11/1940  Lykken _____ 37—42
2,404,287  7/1946  Greer _____ 37—42 X ANTONIO F. GUIDA, *Primary Examiner.*

ABRAHAM G. STONE, *Examiner.*

J. R. OAKS, *Assistant Examiner.*